(Model.)

M. D. TEMPLE.
DROP CHECK VALVE.

No. 290,281. Patented Dec. 18, 1883.

Witnesses,
C. H. Wood.
G. W. Letvin

Inventor.
Morris D. Temple
By Wm Zimmerman
Atty

N. PETERS, Photo-Lithographer, Washington, D. C.

UNITED STATES PATENT OFFICE.

MORRIS D. TEMPLE, OF CHICAGO, ILLINOIS.

DROP CHECK-VALVE.

SPECIFICATION forming part of Letters Patent No. 290,281, dated December 18, 1883.

Application filed March 30, 1881. (Model.)

*To all whom it may concern:*

Be it known that I, MORRIS D. TEMPLE, of Chicago, in the county of Cook and State of Illinois, have invented certain new and useful Improvements in Drop Check-Valves; and I hereby declare the following to be a full, clear, and exact description thereof, which will enable others skilled in the art to which my invention relates to make and use the same, reference being had to the accompanying drawings, forming a part hereof, and in which—

Figure 1:
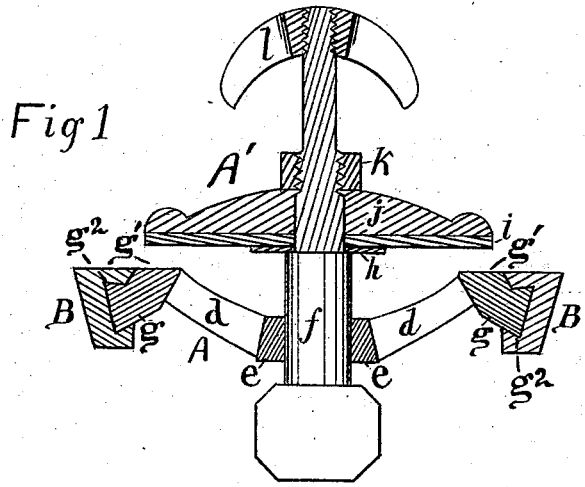
Figure 2:
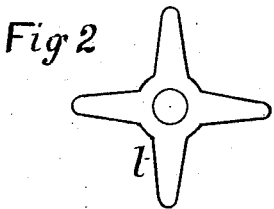
Figure 3:
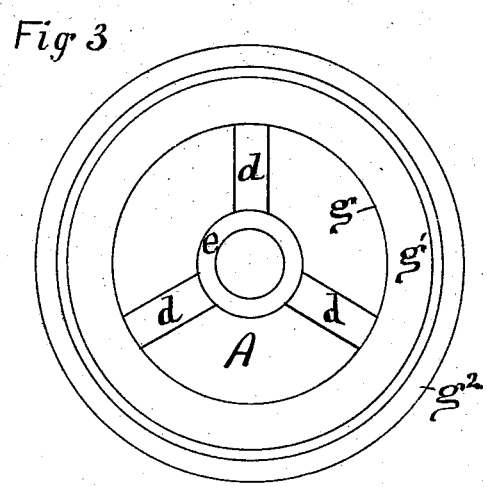
Figure 4:
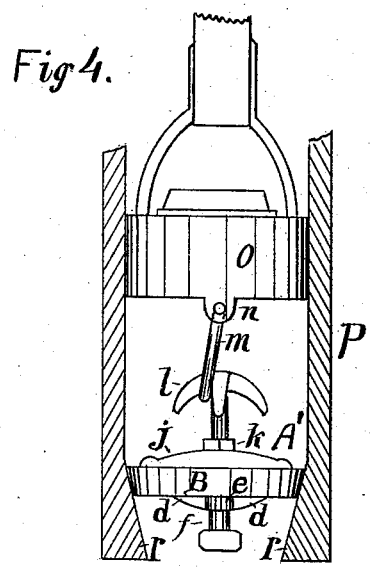

Figure 1 represents a sectional elevation of the apparatus cut through its longitudinal center, except that part of the stem $f$ below the plate $h$. Fig. 2 represents a plan view of the spider $l$. Fig. 3 is a plan view of the ring upon which is formed the valve-seat, and to which are attached the arms $d$ and hub $e$, and from which the dovetailed rubber ring B is removed. Fig. 4 is a vertical section of a pump, showing its interior construction, with my improved check-valve in place and hitched to the pump-bucket, ready to be removed from its seat.

Like letters of reference indicate like parts.

My invention relates to an improved form of drop check-valve provided with an improved removably-attached and elastic packing-ring, and an arrangement by means of which the whole apparatus may be removed from the pump, substantially as hereinafter described.

In the drawings, $g$ represents an annular ring formed on its exterior circumference into a dovetail, $g^2$, upon which is sprung a rubber ring, B, provided with a dovetail groove adapted to fit on the dovetail $g^2$.

Upon the inner circumference of the ring $g$ are attached arms $d$, sustaining the central ring or hub, $e$, and the top of the ring $g$ is formed into a valve-seat, $g'$.

Through the hub $e$ is passed a loosely-fitting stem, $f$, provided at its lower end with a knob, which limits the upstroke of the valve, and at a suitable distance above the knob is formed a shoulder, upon which rests an annular metal ring, $h$, which supports an annular leather or rubber ring, $i$, which forms the packing for the valve $j$ upon its seat $g'$, and which, with the parts $i$ and $h$, are held on the stem $f$ by the nut $k$. The stem $f$ rises above the nut $k$ to a height in about the proportion as shown, upon the end of which is secured a spider, $l$, the arms of which curve downward, so as to form hooks, as shown.

Upon the outer circumference of the ring $g$ is sprung a rubber ring, B, provided with a dovetailed groove to fit over the dovetail $g^2$ of the ring $g$, by means of which said ring is firmly held in place, it, with the ring $g$, being made of a size to fit into the conically-contracted part $r$ of the pump-barrel or bucket-chamber P, as shown.

To the lower end of the pump-bucket $o$ is attached a bail, $m$, by the ears $n$. The bucket $o$ is arranged to play high enough above the spider $l$, so as to prevent the bail $m$ from being caught on its arms in its ordinary working motions.

Within and between the inner circumference of the ring $g$, hub $e$, and arms $d$ are formed the water-ways. The ring $g$, with its arms $d$ and hub $e$, forms a wheel, (designated by the letter A,) and the complete apparatus, as shown in Fig. 1, is designated by the letter A'.

The manner of applying and using my improved drop check-valve is as follows, to wit: The apparatus A' is lowered or dropped into the pump P in its proper vertical position, as shown in Fig. 4, when it will, by means of its elastic packing B and the water-pressure, when in use, seat itself against the conical sides $r$, and form with them a water-tight joint. When from accident or wear the valve fails to work, it may be removed from the pump by either raising the handle to its extreme height, or by removing it from its fulcrum, so that it may be lowered, and so that the bail $m$ may catch over one of the arms of the spider $l$, after which it may be replaced, and by then drawing the handle down, the valve may be lifted from its seat and the pump-bucket, with it attached thereto, removed from the pump without in any manner disturbing any other parts of the pump.

It is not absolutely necessary that the hooks to catch on the bail $m$ be attached to the valve-stem, for they may also quite as readily under different forms be attached to the ring $g$ outside of the valve-seat. By attaching a swinging bail to the lower end of the pump-bucket, as herein shown, the check-valve may be caught and raised by it, by simply lifting the end of the handle high enough or lowering it in its slot far enough for the bail to pass down under the hooks of the check-valve; but the handle does not require to be taken out or from the piston-rod in order that the bucket may be turned around by the piston-rod until a claw or threaded device attached to the valve may catch with a fixed hook attached to the lower end of the pump-bucket. Of the latter, there are several varieties; but I disclaim all such contrivances.

What I claim as new is—

1. The wheel A, provided with valve-seat $g'$ and dovetailed rim $g^2$, in combination with the dovetailed rubber packing B, substantially as herein shown and described.

2. The wheel A, provided with the valve-seat $g'$, in combination with valve $j$, provided with stem $f$ and spider $l$, constructed substantially as and for the purpose specified.

3. The wheel A, provided with valve-seat $g'$, and rubber packing B, in combination with the valve $j$, provided with valve-stem $f$ and spider $l$, constructed substantially as and for the purpose specified.

4. The apparatus A', provided with upward-projecting hooks, in combination with a bucket, $o$, and dependent swinging bail $m$.

5. The drop check-valve A', provided with upward-projecting hooks, in combination with a bucket, $o$, provided with dependent swinging bail $m$, and pump P, having conical seat $r$.

6. The bucket $o$, provided with a bail, $m$, in combination with the wheel A, provided with suitable hooks to engage with the bail $m$, and valve-seat $g'$, valve $j$, stem $f$, and packing B, constructed and arranged to operate substantially as and for the purpose specified.

7. A drop check-valve provided with a series of hooks, in combination with a bucket having a dependent swinging bail, to operate substantially as specified.

MORRIS D. TEMPLE.

Witnesses:
WM. ZIMMERMAN,
JOHN F. FLOWER.